United States Patent [19]
Rees et al.

[11] Patent Number: 5,624,734
[45] Date of Patent: Apr. 29, 1997

[54] CONTINUOUS PROCESS AND APPARATUS FOR GENERATION OF OZONE FOR INDUSTRIAL APPLICATION WITH CRYOGENIC REFRIGERATION

[76] Inventors: Darci L. Rees; Michael George, both of 4431 Jay St., Duluth, Minn. 55802

[21] Appl. No.: 604,620

[22] Filed: Feb. 21, 1996

[51] Int. Cl.⁶ .................................................. B01J 19/08
[52] U.S. Cl. ...................... 422/186.11; 422/186.12; 422/28; 204/176; 210/760
[58] Field of Search .................... 422/186.08, 186.11, 422/186.12, 28; 204/176; 210/760

[56] References Cited

U.S. PATENT DOCUMENTS

| | | | |
|---|---|---|---|
| 2,704,274 | 3/1955 | Allison | 204/176 |
| 2,872,397 | 2/1959 | Kiffer | 204/176 |
| 3,963,625 | 6/1976 | Zowther | 250/533 |
| 4,462,965 | 7/1984 | Azuma et al. | 422/186.08 |
| 5,366,703 | 11/1994 | Ziechti et al. | 422/186.11 |
| 5,472,667 | 12/1995 | Karthaus et al. | 422/31 |
| 5,520,887 | 5/1996 | Shimizu et al. | 422/186.08 |

Primary Examiner—Charles T. Jordan
Assistant Examiner—Daniel Jenkins
Attorney, Agent, or Firm—Mueting, Raasch, Gebhardt & Schwappach, P.A.

[57] ABSTRACT

A continuous process and apparatus for the generation of liquid ozone is provided. This method involves converting an oxygen source to ozone in an ozone generator to yield an ozone-containing gas from which the ozone is separated and used to treat a process fluid stream.

11 Claims, 3 Drawing Sheets

CONTINUOUS PROCESS AND APPARATUS FOR GENERATION OF OZONE FOR INDUSTRIAL APPLICATION WITH CRYOGENIC REFRIGERATION

BACKGROUND OF THE INVENTION

Ozone is generated industrially for application in a number of industrial processes, particularly in water treatment and purification processes. Ozone gas can be used as a replacement for chlorine in many water treatment applications that result in the elimination of harmful chlorinated byproducts. Ozone can also be used as a bleaching agent for products such as clays, pulps, and textiles; an oxidant in both organic and inorganic reactions; a bactericide; and a pharmaceutical intermediate. A gasified ozone beam can be used in processes performed under vacuum, such as the formation of thin films and etching processes.

Ozone is a metastable allotrope of oxygen, and therefore breaks down into molecular oxygen in a relatively short period of time. Furthermore, gaseous ozone in concentrations above 20% can be explosive when it comes in contact with reactive materials such as organic material, ceramic containers, and so forth. As a result, ozone cannot be practically stored and must be generated on site. The high cost of the required ozone generator and ancillary equipment is a significant limiting factor in the use of ozonation technology.

Ozone is generated industrially in most cases by passing a process gas, typically anhydrous oxygen, through a corona discharge. Industrial corona discharge generators typically produce 6% (by weight) ozone when supplied with anhydrous oxygen as the feed gas. The gas mixture exiting the ozone generator, consisting of 6% ozone and 94% oxygen, is typically fed directly into the process fluid. There is usually no provision made for oxygen recovery, resulting in extremely wasteful use of the oxygen. Due to the high level of oxygen waste with this type of system, a tremendous amount of costly oxygen is required to produce relatively small amounts of ozone gas.

Regarding ozone transfer into a process fluid stream, there are certain limitations due to the low conversion rates of oxygen to ozone currently attainable. Henry's Law holds that the solubility of a gas is directly proportional to the partial pressure of the gas above the solution. That is, the more dilute the ozone in the gas mixture, the less ozone will tend to enter into solution. Therefore, even though ozone is 12.5 times more soluble in water than oxygen, transfer of ozone into the process fluid stream is not as readily accomplished as its solubility would indicate due to the low (typically about 6%) concentration of ozone gas attainable with current ozone generation processes. Ozone tends to stay in the gas mixture and ozone waste results. In fact, many ozone applications have ozone destruct equipment installed to destroy expensively generated ozone that has not gone into solution after being injected into the process fluid stream. Eliminating nonreactive carrier gases from the ozone/water interface can essentially eliminate waste of ozone resulting from Henry's Law limitations if the ozone is efficiently injected, and its endpoint concentration is below the equilibrium concentration of pure ozone in the process fluid.

In addition to Henry's Law, the process fluid's temperature and its content of ozone reactive material affects the solubility of ozone. When ozone reactive materials are present in fairly large quantities, ozone mass transfer efficiencies are increased and Henry's Law is no longer the dominant factor in the amount of ozone gas entering into solution in the process fluid. Total ozone consumption increases because the ozone reacts very quickly with the ozone reactive materials. Process fluid temperature also affects ozone mass transfer. As the temperature of the process fluid increases, the solubility of ozone in the process fluid decreases. Process fluid streams in excess of 54° C. are generally avoided in industry. Regardless, whenever nonreactive carrier gases are present in the gas injected into the process fluid, ozone mass-transfer rates and quantities are still affected by Henry's Law. Eliminating nonreactive carrier gases will reduce ozone waste. In the case of higher temperature applications eliminating nonreactive carrier gases will increase ozone mass-transfer rates into the process fluid, which will make more practical the sizing of contacting equipment.

Ozone processing of fluids are an important attribute to industry, but many are limited by inefficient use of oxygen, and unnecessary waste of ozone. What is needed is an efficient and economical continuous process and apparatus for: generating liquid ozone; recycling unused anhydrous oxygen; and eliminating nonreactive carrier gases in the injection equipment.

SUMMARY OF THE INVENTION

The present invention provides a continuous process for generation of ozone for use in treating a process fluid stream; the method comprising:

(a) converting an oxygen source to ozone in an ozone generator to yield an ozone-containing gas;

(b) cooling the ozone-containing gas to produce liquid ozone and a recyclable process gas; the cooling step comprising:
  (i) passing the ozone-containing gas through a heat exchanger to produce cooled ozone-containing gas; and
  (ii) converting the cooled ozone-containing gas to liquid ozone and a recyclable process gas in a first portion of a cryogenic refrigeration unit;

(c) separating the recyclable process gas from the liquid ozone;

(d) directing a first portion of the recyclable process gas to the heat exchanger to cool incoming ozone-containing gas;

(e) directing a second portion of the recyclable process gas to the ozone generator wherein contaminants in the recyclable process gas are vented prior to entering the ozone generator;

(f) collecting the liquid ozone in a second portion of the cryogenic refrigeration unit; and (g) transporting the liquid ozone from the second portion of the cryogenic refrigeration unit to an injection apparatus for treatment of a process fluid stream.

A preferred process of the present invention further includes a method for combining the ozone with a carrier gas such as low pressure steam for injection into the untreated process fluid stream. In this embodiment liquid ozone is evaporated at a controlled rate into low temperature steam, for example, to create a gas mixture comprising about 15% ozone by weight. The mixture, when efficiently injected into the untreated process fluid, which is preferably water, produces an ozone gas concentration of unity.

In a preferred embodiment of the present invention, the oxygen source is transported directly to the cryogenic refrigeration unit as liquid oxygen, where it is allowed to boil to produce a first recyclable gas which is fed through the system to purge air present in the lines. The first recyclable process gas is also used initially as the only source of an ozone generator feed gas for passage through the ozone generator to yield an ozone-containing gas. The ozone-containing gas is cooled in a heat exchanger to produce cooled ozone-containing gas. The cooled ozone-containing gas is further cooled in the cryogenic refrigeration unit to produce liquid ozone and a second recyclable process gas. During start-up the boiling of the anhydrous oxygen source (which produces the first recyclable process gas) occurs from heat produced by an external heater. After the process is running, the boiling occurs from heat contained in the cooled ozone-containing gas entering the cryogenic refrigeration unit. The resulting first recyclable process gas is recycled for use as a coolant in the heat exchanger and as an ozone generator feed gas. The second recyclable process gas is separated from the liquid ozone and also recycled for use as a coolant in the heat exchanger and as an ozone generator feed gas after a portion of it has been vetoed to control contaminant concentration. The liquid ozone is collected in the bottom of the cryogenic refrigeration unit for industrial application.

The present invention also provides a liquid ozone generation apparatus for use in generating liquid ozone. The liquid ozone generation apparatus comprises an ozone generator to generate ozone-containing gas, a heat exchanger through which the ozone-containing gas is cooled to become cooled ozone-containing gas, and a cryogenic refrigeration unit in which the cooled ozone-containing gas is converted to a recyclable process gas and liquid ozone. The liquid ozone is collected in the bottom of the cryogenic refrigeration unit and transported via an injection system for industrial application, such as treatment of an untreated process fluid stream.

The injection system includes a cryogenic refrigerant circulation pump, a transport assembly, and an injection apparatus. The cryogenic refrigerant circulation pump is used to extract cryogenic refrigerant bath from a cryogenic refrigeration unit. The transport assembly includes a first inner pipe to transport refrigerant bath into an injection apparatus, a second inner pipe to transport the liquid ozone into an injection apparatus, and an outer pipe to transport the cryogenic refrigerant bath back to the cryogenic refrigeration unit. The injection apparatus includes means for evaporating liquid ozone into a carrier gas, and means for injecting the mixture of ozone and carrier gas into an untreated process fluid stream.

The continuous process and apparatus of the present invention is advantageous because the oxygen can be recycled to substantially reduce the amount of oxygen and oxygen supply equipment needed for the generation of liquid ozone. With the exception of minor losses during operation, virtually all the oxygen used in the ozonation plant is eventually converted into ozone because of the continuous recycling of the oxygen through the ozone generator. This can dramatically reduce the oxygen feed supply requirement, as well as plant size and operating cost.

Also, the present invention provides for a process and apparatus for substantially pure ozone to be applied directly to an untreated process fluid stream in an injection apparatus that reduces the risk of flash evaporation. Direct application of substantially pure ozone to an untreated process fluid stream is advantageous because most of the ozone will go into solution resulting in less waste of expensively generated ozone. Further, the current invention is particularly advantageous in applications where the solubility of gaseous ozone is quite low, such as when the process fluid stream is warm or hot. In such applications, the size and cost of the ozone-contacting equipment is significantly reduced.

These and other features, aspects, and advantages of the present invention will become better understood with regard to the following description, appended claims and accompanying drawings.

DETAILED DESCRIPTION OF THE INVENTION

The present invention provides a method and apparatus for generation of liquid ozone. The liquid ozone generated is useful in many industrial applications, particularly in treatment of an untreated process fluid stream, such as in a water treatment process. Specifically, the present invention provides a method and apparatus wherein liquid ozone is generated and then injected, preferably as a gaseous mixture of ozone and steam, into an untreated process fluid stream to produce a treated process fluid stream.

At start-up, a liquid oxygen source is directed to a cryogenic refrigeration unit where a portion of it is boiled through use of a heater in the cryogenic refrigeration unit and the remainder forms a cryogenic refrigerant bath. A first recyclable process gas results from the boiling of the liquid oxygen and is directed through the system to purge air out of the lines in the system. This first recyclable process gas is typically used during start-up as the only source of an ozone generator feed gas which is converted to ozone-containing gas in an ozone generator. The ozone-containing gas is cooled in a heat exchanger and then enters a cryogenic refrigeration unit where it is converted to liquid ozone and a second recyclable process gas. The liquid ozone collected at the bottom of the cryogenic refrigeration unit is transported to the injection apparatus wherein it is evaporated at a controlled rate and preferably mixed with a carrier gas, such as low temperature steam. The gas mixture of low temperature steam and ozone is then preferably injected into an untreated process fluid stream for treatment of the untreated process fluid stream. The liquid ozone is protected from thermal disruption while it is being transported to the injection apparatus and while it is in the injection apparatus by a cryogenic refrigerant which has been pumped out of the cryogenic refrigeration unit. The first and second recyclable process gases exit the cryogenic refrigeration unit in separate lines, and are directed through the heat exchanger for use as coolants. After passing through the heat exchanger, the first recyclable process gas and the second recyclable process gas are then combined in one line after a portion of the second recyclable process gas has been vented to control contaminant concentrations. The combined process gases become the ozone generator feed gas which enters the ozone generator for conversion to ozone-containing gas.

The process of the present invention is unlike conventional ozone treatment systems in which neither the first recyclable process gas nor the second recyclable process gas, usually oxygen, is recycled. Furthermore, in conventional ozone treatment systems, a mixture of noncondensible gases (typically oxygen and ozone) is used for treatment of the untreated process fluid stream rather than a mixture of low temperature steam and ozone. By recycling the process gases, and preferably injecting a mixture of low temperature steam and gaseous ozone rather than a gaseous mixture of oxygen and ozone into an untreated process fluid stream, the present invention provides an economical and efficient process and apparatus that reduces the amount of oxygen supply required and reduces the waste normally associated with generation of ozone and injection of gaseous ozone into an untreated process fluid stream.

Figure 1:
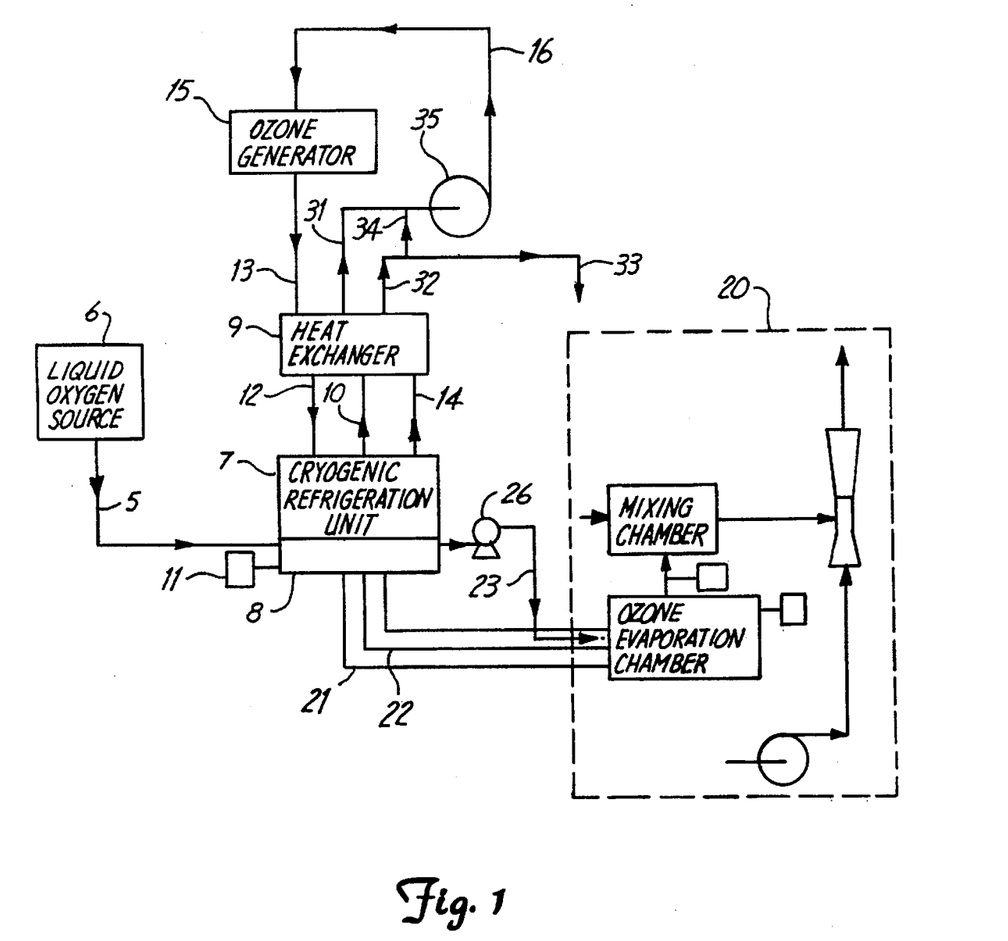
FIG. 1 is a simplified flow diagram of a preferred embodiment of the present invention.

Referring to FIG. 1, a preferred apparatus for the efficient and economical generation of liquid ozone and for treatment of an untreated process fluid stream is shown. A cryogenic make-up line 5 runs from a liquid oxygen source 6 to a cryogenic refrigeration unit 7 to maintain a suitable level of cryogenic refrigerant bath 8 in the cryogenic refrigeration unit 7. At start-up, liquid oxygen is directed to the cryogenic refrigeration unit 7 wherein at least a portion of the liquid oxygen is boiled to form a first recyclable process gas, which is then directed to a heat exchanger 9 along line 10. During start-up, the boiling of the cryogenic refrigerant bath 8 results from an external heater 11 connected to the cryogenic refrigeration unit 7. The heater 11 can be selected from any number of suitable heaters, such as a heater coil or a motor, for example. Once the process is running, heat in cooled ozone-containing gas which enters the cryogenic refrigeration unit 7 along line 12 causes the cryogenic refrigerant bath 8 to boil, producing the first recyclable process gas.

As stated above, liquid ozone and a second recyclable process gas are also produced in the cryogenic refrigeration unit 7 from the cooled ozone-containing gas. The first recyclable process gas and the second recyclable process gas enter the heat exchanger 9 along lines 10 and 14, respectively, and are thereafter combined to form an ozone generator feed gas, which enters an ozone generator 15 along line 16. The liquid ozone exiting the cryogenic refrigeration unit 7 is transported to the injection apparatus 20 through a pipe 22. The pipe 22 is contained within an outer insulating pipe 21. The injection apparatus 20 is used to inject the liquid ozone, which is preferably converted to gaseous ozone and combined with steam, into an untreated process fluid stream.

The liquid oxygen source 6 is preferably oxygen that has a purity of at least about 97%, with the contaminants being primarily argon and nitrogen. The liquid oxygen can be supplied from any suitable source of liquid oxygen, but is preferably supplied from a liquid oxygen tank or a cryogenic plant. Liquid oxygen produces a substantially anhydrous feed gas. Anhydrous feed gas is required because the efficiency of ozone generation and equipment lifetime is strongly dependent upon the ozone generator feed gas' moisture content. Most ozone generation equipment requires feed oxygen to be dried below a −51° C. dewpoint for satisfactory operation. Because liquid oxygen is essentially anhydrous (−129° C. dewpoint), further moisture removal equipment is not typically necessary.

Alternatively, the process can be ran, with minor modifications, using an air fed system rather than a liquid oxygen source. The air fed system includes anhydrous air as the oxygen source. Air fed systems, however, contain residual carbon dioxide which sublimes on the surfaces of the heat exchanger. A back flow system can be used to periodically purge solid carbon dioxide from the heat exchanger surfaces. Although air fed systems are practically limited to about 2% ozone content in the ozone-containing gas exiting the ozone generator, with the injection of a low temperature steam/ozone mixture into the untreated process fluid stream, the performance of an air fed system is significantly enhanced with the present process and apparatus.

The ozone generator feed gas preferably consists of anhydrous oxygen with a small amount of contaminants, primarily argon and nitrogen. The level of contaminants in the ozone generator feed gas entering the ozone generator is controlled by the rate of vent at line 33 (FIG. 1). Referring to FIG. 1, the ozone generator/fed gas is fed into the ozone generator 15 along line 16. The ozone generator 15 can be selected from a wide variety of suitable ozone generators which will convert the ozone generator feed gas into an ozone-containing gas. The ozone generator 15 is preferably a corona discharge type generator cooled by a water jacket.

The ozone-containing gas produced in the ozone generator is preferably about 1% to about 6% ozone. The remainder is anhydrous oxygen with some contaminants, primarily argon and nitrogen. The amount of contaminants in the ozone-containing gas exiting the ozone generator 15 along line 13 is preferably less than about 10%. It typically exits the ozone generator at a temperature of about 10°–27° C.

Figure 2:
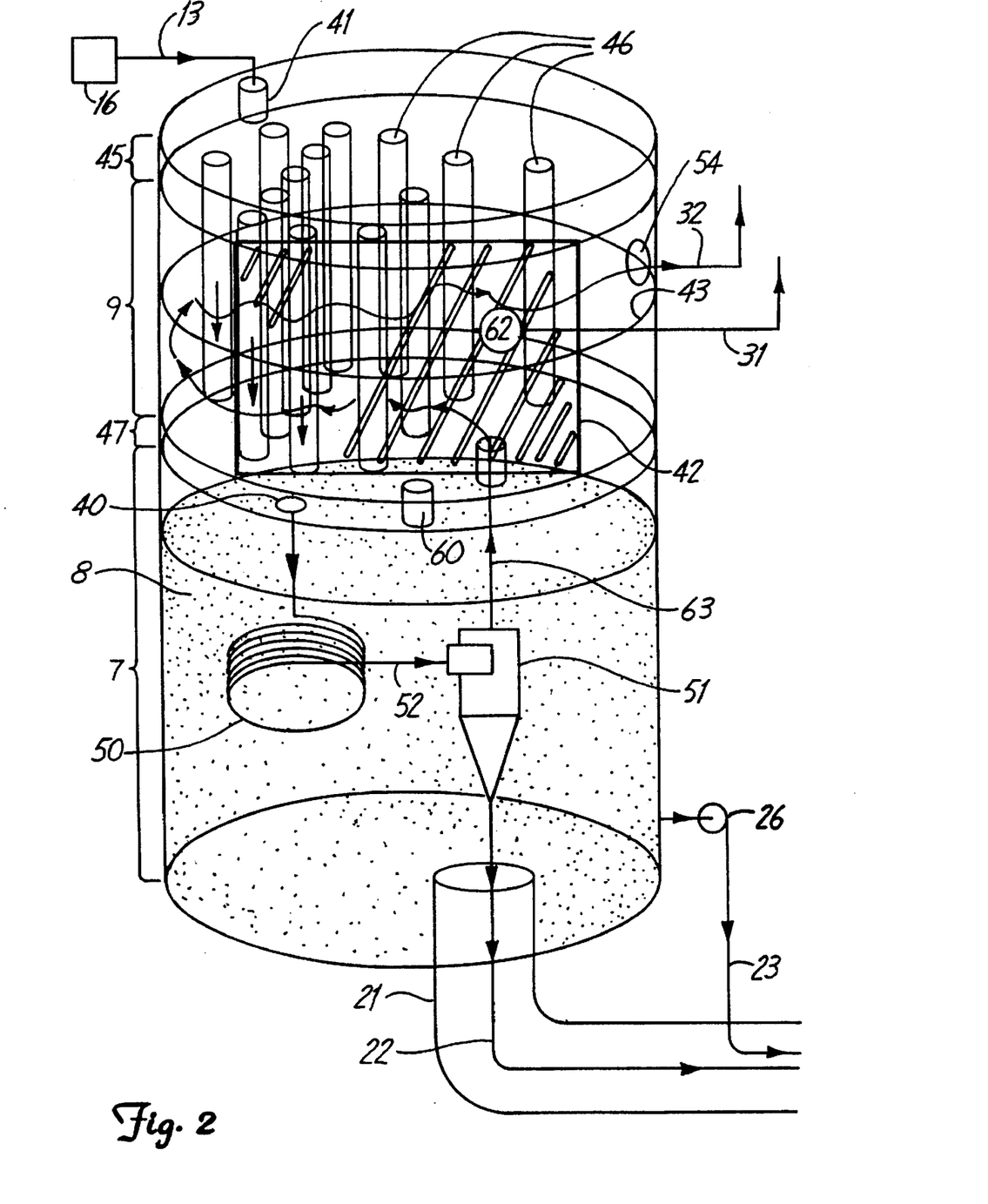
FIG. 2 is a cut-away side view of a particularly preferred cryogenic refrigeration unit and heat exchanger apparatus of the present invention.

In a preferred embodiment, the ozone-containing gas exiting the ozone generator 15 along line 13 passes through a heat exchanger 9 where it is cooled to a temperature of about −180° C. to about −150° C., preferably without contact with either the first recyclable process gas or the second recyclable process gas, both of which enter the heat exchanger 9 along lines 10 and 14, respectively. The cooled ozone-containing gas exiting the heat exchanger 9 along line 12 is then converted and separated into liquid ozone and the second recyclable process gas in the cryogenic refrigeration unit 7. The liquid ozone is substantially pure, such that there is less than about 10% (and preferably less than about 5%) impurities present in the liquid ozone. The heat exchanger 9 and cryogenic refrigeration unit 7 can be separated as shown in FIG. 1. More preferably the heat exchanger 9 and the cryogenic refrigeration unit 7 can be contained in the same vessel (as shown in FIG. 2, which is discussed below).

In addition to using the heat from the cooled ozone-containing gas entering the cryogenic refrigerant unit to boil the cryogenic refrigerant, and recycling the resulting process gas (referred to as the first recyclable process gas herein), advantage is also gained by recycling a second recyclable process gas which is formed in the cryogenic refrigeration unit when ozone is condensed out of the cooled ozone-containing gas. Both the first recyclable process gas and the second recyclable process gas are used to cool the ozone-containing gas being passed through the heat exchanger. If the cryogenic refrigerant bath being used in the cryogenic refrigeration unit is liquid oxygen, both process gases are joined together, after passage through the heat exchanger and venting of contaminants present in the second recyclable process gas, to become the ozone generator feed gas. This recycling of the process gases contributes to the reduction in requirement for oxygen feed supply as well as reduction in overall costs. Alternatively, if a non-oxygen cryogenic refrigerant bath is used in the cryogenic refrigeration unit, the first recyclable process gas resulting from the boiling of the cryogenic refrigerant bath is vented (and possibly recycled to a separate system) from the system after passing through the heat exchanger. Advantage has still been gained by using this nonrecyclable first process gas as a coolant in the heat exchanger for the incoming ozone-containing gas.

Referring to FIG. 1, the source of the cryogenic refrigerant bath 8 is preferably from the liquid oxygen source 6 which enters the cryogenic refrigeration unit 7 along the cryogenic make-up line 5. Alternatively, the source of the cryogenic refrigerant bath 8 is from a separate dedicated refrigeration line. Any commonly available gas with a boiling temperature substantially colder than ozone's boiling temperature can be used as a cryogenic refrigerant, such as nitrogen or argon. If a non-oxygen cryogenic refrigerant is used, however, the first recyclable process gas produced in the cryogenic refrigeration unit would need to be recycled to the refrigeration system, but could still be used as a coolant in the heat exchanger 9. Furthermore, with the use of a non-oxygen cryogenic refrigerant (rather than the liquid oxygen source 6), an alternative source of gaseous, essentially anhydrous, oxygen would need to be supplied to the ozone generator feed gas along line 16.

The liquid ozone exits the cryogenic refrigeration unit 7 at a temperature of about −180° C. to about −170° C. and is about 95–99% pure ozone. It flows by differential pressure to the injection apparatus 20 through a pipe 21 which is preferably insulated. FIG. 2 shows a preferred embodiment of the injection system in which the pipe 21 contains an inner ozone transport pipe 22 through which the liquid ozone flows, and an inner refrigerant transport pipe 23 through which the forward flowing cryogenic refrigerant flows. Returning cryogenic refrigerant flows back to the cryogenic refrigeration unit 7 through pipe 21 around inner pipes 22 and 23. This combination of inner pipes 22 and 23 and outer pipe 21 is referred to herein as a transport assembly. The liquid ozone is protected from thermal disruption in the inner transport pipe 22 by immersion of the inner transport pipe 22 in the return flowing cryogenic refrigerant contained in the insulated outer transport pipe 21. The inner refrigerant transport pipe 23 preferably enters into the insulated outer transport pipe 21 and runs coaxially through it to the injection apparatus 20. The liquid ozone and the forward flowing cryogenic refrigerant flow into the injection apparatus 20 through their own pipes 22 and 23, respectively, but both are contained within the insulated outer transport pipe 21.

Referring to FIG. 1, the source of the forward flowing cryogenic refrigerant and the return flowing cryogenic refrigerant is the cryogenic refrigerant bath 8 in the cryogenic refrigeration unit 7. A portion of the cryogenic refrigerant bath 8 is preferably extracted from the cryogenic refrigeration unit 7 by a cryogenic refrigerant circulation pump 26 to become the forward flowing cryogenic refrigerant in the inner refrigerant transport pipe 23. The forward flowing cryogenic refrigerant enters the injection apparatus and then returns in the insulated outer transport pipe 21 as the return flowing cryogenic refrigerant to the cryogenic refrigeration unit 7, where it again becomes a part of the cryogenic refrigerant bath 8.

As stated above and shown in FIG. 1, a first recyclable process gas is generated by boiling the cryogenic refrigerant bath 8 in the cryogenic refrigeration unit 7 and is directed to the heat exchanger 9 along line 10. After start-up, boiling of the cryogenic refrigerant bath 8 occurs because of the heat present in the cooled ozone-containing gas entering the cryogenic refrigeration unit 7 along line 12.

The first recyclable process gas preferably enters the heat exchanger 9 along line 10, preferably without direct contact with the incoming ozone-containing gas, and exits the heat exchanger along line 31 as warmed first recyclable process gas. The second recyclable process gas which has had liquid ozone condensed from it leaves the cryogenic refrigeration unit 7 along line 14, preferably near the temperature of the cryogenic refrigerant bath 8. The second recyclable process gas enters the heat exchanger 9 along line 14 where it is warmed, preferably without direct contact with the incoming ozone-containing gas. The second recyclable process gas leaves the heat exchanger 9 as warmed second recyclable process gas along line 32.

The warmed second process gas in line 32 is split into a blowdown gas and a recycle gas stream in lines 33 and 34, respectively. The blowdown gas in line 33 is the smaller of the two and is preferably vented to control the buildup of contaminants. Alternatively, if the pressure of the blowdown gas in line 33 is less than ambient, which can occur in some variations of the current invention, an extraction blower can be used to extract the blowdown gas in line 33.

The recycle gas stream in line 34 is allowed to mix with the warmed first recyclable process gas in line 31 to produce the ozone generator feed gas in line 16. System motive force for the ozone generator feed gas in line 16 is preferably supplied with a process gas recycle blower 35 which is rated for oxygen usage. Placement of the process gas recycle blower 35 after the heat exchanger 9 avoids the need for the process gas recycle blower 35 to be rated for cryogenic temperatures, as the ozone generator feed gas in line 16 is at about ambient temperature.

Referring to FIG. 2, a particularly preferred embodiment of the heat exchanger 9 and the cryogenic refrigeration unit 7 are shown contained together in one vessel, separated by an orifice 40. Ozone-containing gas exiting the ozone generator 16 along line 13 is preferably at a temperature of about 10° C. to about 27° C. The ozone-containing gas in line 13 enters into a pipe 41 and then into the heat exchanger 9, which is preferably a gas-to-gas reverse flow type heat exchanger and more preferably a common multipass shell and tube type heat exchanger. Most preferably, the heat exchanger 9 also has a partition 42 to keep the first recyclable process gas and the second recyclable process gas separate. For simplicity, FIG. 2 depicts a two-pass shell and tube-type heat exchanger 9 with one baffle 43 in the shell side (i.e., the portion of the heat exchanger outside the small diameter tubes and inside the outer shell). In use, any suitable multipass shell with a suitable number of baffles in the shell side can be used. Partition 42 essentially divides the heat exchanger into two separate heat exchangers. The ozone-containing gas in line 13 enters first into a top plenum 45 and then into one or more tubes 46. The ozone-containing gas cools as it traverses through the tubes 46 to become cooled ozone-containing gas.

The cooled ozone-containing gas enters the bottom plenum 47 at a temperature approaching the liquefaction temperature of ozone, but slightly above the ozone dewpoint, preferably about −160° C. to about −150° C. In a preferred embodiment, cooled ozone-containing gas exits the heat exchanger 9 and enters into the cryogenic refrigeration unit 7 through the orifice 40.

Referring to FIG. 2, the cryogenic refrigeration unit 7 includes a first portion 50 (here shown as a chiller coil) and a second portion 51 (here shown as a cyclonic separator). Both portions are immersed in a bath of cryogenic refrigerant fluid 8, preferably liquid oxygen from the liquid oxygen source 6. More preferably, the fluid level partially fills the cryogenic refrigeration unit 7 to allow refrigerant evaporation to contribute to the make-up of the cooled ozone-containing gas in line 12 (not shown). In this way, the temperature of the cooled ozone-containing gas can drop below the temperature needed to liquefy nearly all the ozone in the cooled ozone-containing gas forming a mixture of condensed liquid ozone and first recyclable process gas in the first portion 50 of the cryogenic refrigeration unit 7.

As stated previously, the liquid ozone is substantially pure such that there are less than 10% impurities, and preferably less than about 5% impurities. Ozone has a boiling temperature of about −112° C. and molecular oxygen has a boiling point of about −183° C. at atmospheric pressure. The relatively large difference in boiling temperatures makes ozone relatively easy to separate from oxygen.

The first portion 50 of the cryogenic refrigeration unit 7 is preferably a condensation unit comprised of a high surface area device, such as a chiller coil arranged in a descending fashion, constructed of largely inert material (i.e., nonreactive with ozone), such as stainless steel. In a preferred embodiment, the cooled ozone gas is converted to liquid ozone and the first recyclable process gas in the first portion 50 flows to the end of the chiller coil where it enters the second portion 51 of the cryogenic refrigeration unit 7 along line 52.

The second portion 51 of the cryogenic refrigeration unit 7 is preferably a separation element, which is connected to the first portion 50 by a suitable duct 52. In the separation element, liquid ozone is separated from the second recyclable process gas. The separation element can be any suitable apparatus for separating liquids from gases, such as a glass bead packed column. The separation element is more preferably a cyclonic separator.

The liquid ozone collects at the bottom of the second portion 51, preferably a cyclonic separator, and flows by differential pressure through the inner transport pipe 22 to the injection apparatus 20 (not shown). The differential pressure can be supplied by the second recyclable gas being at a pressure greater than ambient pressure, Bernoulli forces, gravity, or a combination thereof.

The first recyclable process gas which is generated from the cryogenic refrigerant bath 8 in the cryogenic refrigeration unit 7 passes through a first pipe 60 into the shell side of the heat exchanger 9. The first recyclable process gas is preferably kept separate from the second recyclable process gas by the partition 42. The first recyclable process gas traverses the shell side by passing around baffle 43 and warms up through heat exchange with the tubes 46. The first recyclable process gas exits the heat exchanger 9 as warmed first recyclable process gas through a second pipe 62 and is then fed into line 31.

The second recyclable process gas which consists of anhydrous oxygen with increased concentrations of contaminants, such as argon or nitrogen, leaves the separation element 51 through a third pipe 63. The second recyclable process gas is preferably at a temperature of at least the temperature needed to gasify oxygen but no greater than the temperature needed to liquefy ozone, and more preferably at a temperature of about −180° C. to about −150° C. at atmospheric pressure. The second recyclable process gas traverses the shell side by passing around the baffle 43 and warms up through heat exchange with the tubes 46. The second recyclable process gas then exits the heat exchanger 9 as warmed second recyclable process gas through a fourth pipe 64 and is then fed into line 32.

Preferably, all materials including pipes and pumps, etc., which are exposed to ambient temperatures are insulated to minimize heat transfer. Furthermore, all equipment in contact with ozone is constructed of nonreactive materials. Experience has taught that ozone will explode when allowed to boil violently, but has less of a tendency to do this if the evaporation rate is at or below that of nucleate boiling (the formation of bubbles on the walls of the evaporation flask). Departure from nucleate boiling (i.e. violent boiling) is avoided by this method and substantially pure ozone gas can be generated.

Also, the present invention provides a process and apparatus for liquid ozone to be applied directly to an untreated process fluid stream in an injection apparatus which minimizes the risk of flash evaporation. Direct application of substantially pure ozone to an untreated process fluid stream is advantageous because most of the ozone will go into solution resulting in less waste of expensively generated ozone. Further, the current invention is particularly advantageous in applications where the solubility of gaseous ozone is quite low, such as when the untreated process fluid stream is warm or hot. In such applications, the size and cost of the ozone-contacting equipment is significantly reduced. This process preferably uses low pressure steam as a carrier gas for the release of liquid ozone in the injection apparatus. When the gaseous mixture of low temperature steam/ozone rapidly contacts the untreated process water in the venturi eductor, for example, the steam condenses leaving essentially pure ozone gas. This has the advantage of injecting substantially pure ozone into the untreated process fluid stream without causing any significant impact when the ozone enters the process fluid stream.

Figure 3:
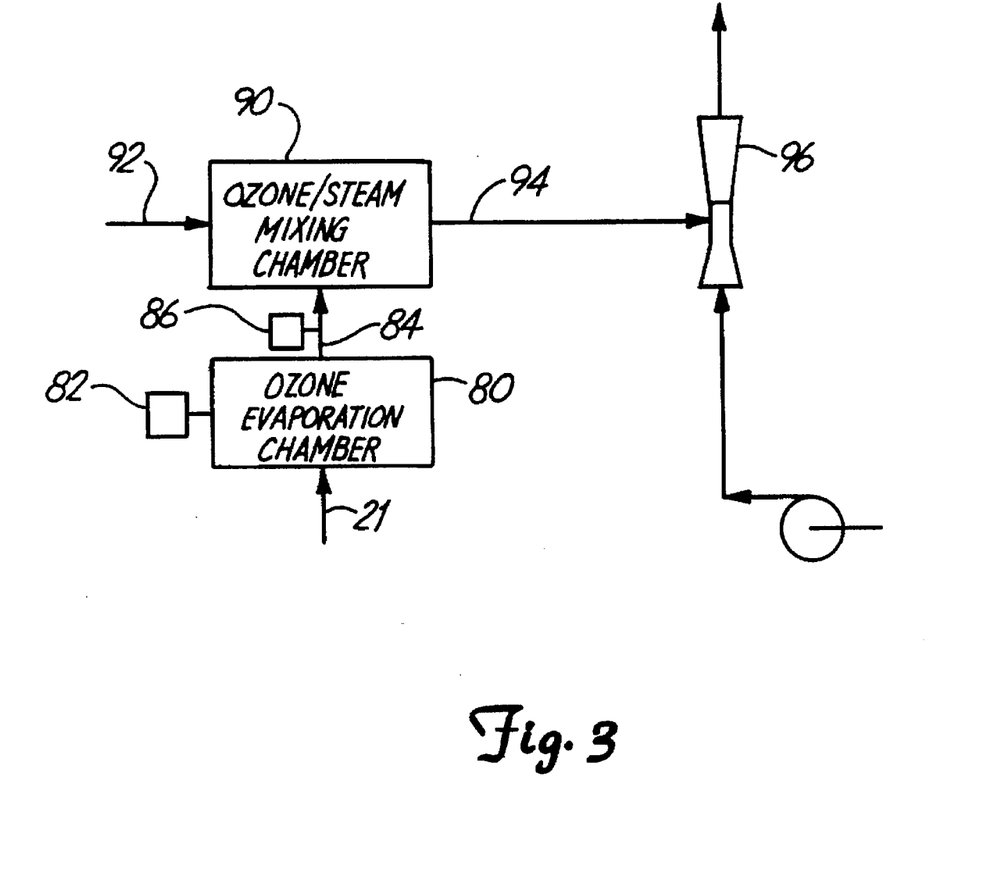
FIG. 3 is a simplified schematic of a preferred embodiment of the injection system of the present invention.

FIG. 3 shows an injection apparatus 20 for evaporating the ozone into a carrier gas and injecting the mixture of ozone and carrier gas into a process fluid stream. In a preferred embodiment, low pressure steam is used as the carrier gas during the release of the ozone. Specifically, the liquid ozone traveling along line 21 enters into an ozone evaporation chamber (80) where it is evaporated at a controlled rate. Heat for the evaporation process is provided with a heater (82), typically an electric resistance heater. The gasified ozone travels along line (84) where it is heated further by electric heater (86) to a temperature approximating the temperature of the carrier gas (e.g., steam) with which it will be combined. The pure ozone gas enters mixing chamber 90, where it mixes with low temperature steam, for example, entering from line 92. The gaseous ozone/steam mixture travels along line 94 to unit 96 where it is injected into the untreated process fluid stream. This embodiment can be used to inject high concentrations of ozone (above 15% by weight) into a process liquid (usually water), and eliminate Henry's Law losses of ozone.

Henry's law states that the equilibrium of gas absorbed into a liquid is dependent on the partial pressure of gas in contact with the liquid. That is, as the partial pressure of a gas constituent is raised, its equilibrium concentration in an adjacent liquid will also increase. This fact has important consequences when ozone is used as a process gas in the treatment of liquids (often water).

Ozone is generated at the point of application, usually in concentrations of from 1% to 12%, often about 6%. The residual gas stream is usually air or oxygen, although other gases are also envisioned. When the gas mixture containing ozone is injected into the process liquid, the amount of ozone entering into the process liquid is often determined by Henry's Law, particularly in water treatment plants where the process liquid is naturally low in ozone reactive substances. Since the concentration of ozone in the process gas is relatively low, its partial pressure is relatively low. As a result, significant losses of ozone occur because not all of the ozone goes into solution in the process liquid. Because ozone is relatively expensive to generate for industrial usage, reducing or eliminating ozone losses from Henry's Law effects can significantly improve the efficiency and economics of ozone-based liquid treatment processes, particularly water-based processes.

Experience with concentrations of ozone above 15% by weight indicate an unpredictable explosive tendency. As a result, high concentrations of ozone are generally avoided in industrial usage. The current invention solves this problem by a novel process and apparatus which allows up to about 100% ozone transfer into the process liquid, while tailoring the limit of ozone concentration to the individual process.

Referring to FIG. 3, ozone gas enters a mixing chamber 90, where it encounters low temperature steam (at a temperature of about 43°–65° C.). In order for the low temperature steam to exist in the gas state, the mixing chamber 90 is evacuated to about 1.7 psia, or less for 100% steam. The chamber can be operated at a decreased vacuum based on the concentration of ozone. That is, if a 50% volume mixture of ozone (72% weight mixture) is used, the mixing chamber vacuum could be decreased to 3.4 psia at 49° C., for example, while still remaining above the dewpoint of the steam. The steam is generated by boiling water at low temperature/pressure in a contained vessel upstream from the ozone/steam mixing chamber. By controlling the relative boiling/evaporation rates of the steam and ozone, respectively, the concentration of ozone in the gas mixture to be injected into the process fluid can be accurately controlled. Ozone concentration in the gas mixture can be anything from approaching zero percent to approaching one hundred percent. Higher ozone concentrations (above 30% by weight) are desirable so that steam generation equipment, and overall process gas flows may be minimized. The practical upper limit of ozone concentration will depend upon the process liquid being treated. The safe upper limit of ozone concentration will be that at which ozone will not react violently to injection. In cases where 100% ozone concentrations can be safely injected, the steam generation/mixing equipment can be shut off or eliminated.

Controlling the relative boiling/evaporation rates can be accomplished by the use of a valve or vacuum pump between the water boiling vessel, and the ozone/steam mixing chamber. The vacuum for the ozone/steam mixing chamber and its motive force for injection into the process liquid is supplied by a venturi eductor 96. Venturi eductors are currently available which produce up to 29.5 inches Hg (mercury) vacuum at the gas injection point (this converts to 0.87 psia absolute pressure). This means that the vacuum available from the ozone/steam mixing chamber 90, through its transport line 94 to the venturi eductor 96 and into the process fluid can be maintained at or below the approximately 1.7 psia pressure needed to maintain the steam in the gas state. The process liquid is always at an elevated pressure, usually about 45 psia upstream of the venturi eductor, and about 25 psia downstream of the venturi eductor. The temperature of the process water is usually about 20° C., but can be as high as about 66° C. Process fluid temperatures above 66° C. are usually avoided in industrial ozone treatment, because ozone rapidly breaks down into oxygen above about 66° C., and its solubility in water is also very limited at these elevated temperatures.

This process allows for the delivery of essentially 100% ozone gas to the water treatment process. Since the equilibrium concentration of 100% ozone gas in water at normal process temperatures is above 10 ppm (often above 100 ppm), ozone transfer into the water is very rapid and can be complete. As a result, essentially no ozone waste results. The overall process efficiency is improved, energy consumption is significantly reduced, and the need for ozone destruct equipment is eliminated.

The process and apparatus of the present invention can be used in many processes that require mixing of ozone and a process fluid stream including water treatment, purification, bleaching, and so forth. It can also be used in reducing odors.

Also, since ozone is used in so many other applications including as an oxidant, a bactericide, pharmaceutical intermediate, processes performed under vacuum, etc., the process and apparatus of the present invention have applicability in procedures outside treatment of a process fluid stream where it is necessary to efficiently and economically produce and utilize liquid ozone.

In summary, the continuous process and apparatus of the present invention, preferably with liquid oxygen as the oxygen source, is advantageous because the liquid oxygen can be recycled to substantially reduce the amount of oxygen and oxygen supply equipment needed for the generation of liquid ozone. With the exception of minor losses during operation, virtually all the oxygen used in the ozonation plant is eventually converted into ozone because of the continuous recycling of the oxygen through the ozone generator. This can dramatically reduce the oxygen feed supply requirement, as well as plant size and operating cost.

The present invention also has the advantage of being able to run on an air-fed system. Although slightly less efficient than an oxygen-fed system, the use of cryogenic refrigeration to produce liquid ozone together with the recycling of process gases and the ability to add 100% ozone to the untreated process fluid stream results in a very efficient and economical process.

Although the present invention has been described in considerable detail with reference to certain preferred versions thereof, other versions are possible. For example, if necessary, heat can continue to be supplied after start-up to the liquid oxygen source to increase the vaporization rate of the liquid oxygen. Also, the entire process can be run under pressure which requires minor adjustments to the process and apparatus, particularly the condensation unit, as the onset of condensation of the liquid ozone in the condensation unit will be at a higher temperature. Therefore, the spirit and scope of the appended claims should not be limited to the description of the preferred embodiments contained herein.

What is claimed is:

1. A continuous process for generation of ozone for use in treating a process fluid steam; the method comprising:
   (a) converting an oxygen source to ozone in an ozone generator to yield an ozone-containing gas;
   (b) cooling the ozone-containing gas to produce liquid ozone and a recyclable process gas; the cooling step comprising:
      (i) passing the ozone-containing gas through a heat exchanger to produce cooled ozone-containing gas; and
      (ii) converting the cooled ozone-containing gas to liquid ozone and a recyclable process gas in a first portion of a cryogenic refrigeration unit;
   (c) separating the recyclable process gas from the liquid ozone;
   (d) directing a first portion of the recyclable process gas to the heat exchanger to cool incoming ozone-containing gas;
   (e) directing a second portion of the recyclable process gas to the ozone generator wherein contaminants in the recyclable process gas are vented prior to entering the ozone generator;
   (f) collecting the liquid ozone in a second portion of the cryogenic refrigeration unit; and
   (g) transporting the liquid ozone from the second portion of the cryogenic refrigeration unit to an injection apparatus for treatment of a process fluid stream.

2. The process of claim 1 wherein:
   (a) the step of converting an oxygen source to ozone comprises:
      (i) transporting an oxygen source to a cryogenic refrigeration unit as liquid oxygen;
      (ii) boiling the oxygen source to produce a first recyclable process gas; and
      (iii) passing the first recyclable process gas through an ozone generator to yield an ozone-containing gas; and
   (b) the step of cooling comprises:
      (i) passing the ozone-containing gas through a heat exchanger to produce cooled ozone-containing gas; and
      (ii) converting the cooled ozone-containing gas to liquid ozone and second recyclable process gas in a first portion of the cryogenic refrigeration unit.

3. The process of claim 2 wherein the process further includes:
   (a) evaporating the liquid ozone into a carrier gas; and
   (b) injecting the gas mixture into a process fluid stream.

4. The process of claim 3 wherein the liquid ozone exiting the cryogenic refrigeration unit is at a temperature of about −180° C. to about −175° C. and is about 95% to about 99% pure ozone.

5. The process of claim 3 wherein low pressure steam is used as a carrier gas for injection of the ozone into the untreated process fluid stream.

6. The process of claim 1 wherein the ozone-containing gas exiting the ozone generator is at a temperature of about 10° C. to about 27° C. having about 1% to about 6% ozone gas.

7. The process of claim 1 wherein the cooled ozone-containing gas exiting the heat exchanger is at a temperature of about −180° C. to about −150° C.

8. An ozone generation and process fluid stream treatment apparatus comprising:
   (a) an ozone generator to generate ozone-containing gas;
   (b) a heat exchanger through which the ozone-containing gas is cooled to become cooled ozone-containing gas;
   (c) a cryogenic refrigeration unit in which the cooled ozone-containing gas is converted to a recyclable process gas and liquid ozone; and
   (d) an injection system for use in treatment of a process fluid stream; the injection system comprising:
      (i) a cryogenic refrigerant circulation pump to extract cryogenic refrigerant bath from a cryogenic refrigeration unit;
      (ii) a transport assembly comprising a first inner pipe to transport refrigerant bath into an injection apparatus; a second inner pipe to transport the liquid ozone into an injection apparatus; and an outer pipe to transport the cryogenic refrigerant bath back to the cryogenic refrigeration unit; and
      (iii) an injection apparatus comprising:
         (A) means for evaporating liquid ozone into a carrier gas; and
         (B) means for injecting the mixture of ozone and carrier gas into an untreated process fluid stream.

9. The apparatus of claim 8 wherein the heat exchanger comprises:
   (a) an upper plenum;
   (b) a shell side having at least one baffle therein, the shell side being connected to the upper plenum;
   (c) one or more tubes connected to the upper plenum;
   (d) a lower plenum connected to the tubes;
   (e) a partition disposed between the upper plenum and the lower plenum; and
   (f) an orifice for connection of the heat exchanger to the cryogenic refrigeration unit.

10. The apparatus of claim 8 wherein the cryogenic refrigeration unit comprises:
   (a) a first portion having a condensation unit comprised of a high surface area device constructed of largely inert material; and
   (b) a second portion having a separation element for separation of the liquid ozone from the second recyclable process gas wherein the separation element is connected to the condensation unit.

11. The apparatus of claim 8 further including:
   (a) a process gas blower to draw the recyclable process gas through the heat exchanger to become the ozone generator feed gas; and
   (b) a vent to release contaminants from the system.

* * * * *

UNITED STATES PATENT AND TRADEMARK OFFICE
CERTIFICATE OF CORRECTION

PATENT NO. : 5,624,734

DATED : April 29, 1997

INVENTOR(S) : Darci L. Rees, et al.

Page 1 of 2

It is certified that error appears in the above-identified patent and that said Letters Patent is hereby corrected as shown below:

On the title page,

Item 56 (References Cited - U.S. Patent Documents), insert the following:

--2,876,188  3/1959   Thorp et al...................204/176
3,134,648   5/1964   Chiras..........................23/222
3,616,382   10/1971  Bartle, Jr. et al..............204/176
3,660,277   5/1972   McWhirter et al.............210/6
4,131,528   12/1978  Tsujimoto et al.............204/157.1R
4,256,574   3/1981   Bhargava......................210/614
5,332,555   7/1994   Hosokawa et al............422/186.05--

Item 56, insert the following:
--Foreign Patent Documents
4,207,585   3/1992   Germany
55-6563     2/1980   Japan Harper et al., "Detonation Proerties of Ozone," <u>Advances in Chemistry Series</u>,
  <u>21:28</u>, 28-37 (1959)
McBride et al., "Ozoning the Aqueduct," Reprinted from <u>Civil Engineering</u>
  (December 1987) (3pp.)
Nebel, "Ozone," <u>Encylopedia of Chemical Technology</u>, Third Edition, <u>16</u>
  eds. Kirk-Othmer, 683-713 (1981)
"Ozonation Pretreatment to Filtration at the Los Angeles Aqueduct Filtration
  Plant," Los Angeles Department of Water and Power Publication (4 pp)(Not Dated)--

UNITED STATES PATENT AND TRADEMARK OFFICE
CERTIFICATE OF CORRECTION

PATENT NO. : 5,624,734
DATED : April 29, 1997
INVENTOR(S) : Darci L. Rees, et al.

It is certified that error appears in the above-identified patent and that said Letters Patent is hereby corrected as shown below:

Col. 5, line 58, delete "ran" and insert --run--; and

Col. 6, line 9, delete "generator/fed" and insert --generator feed--.

Signed and Sealed this

Eighteenth Day of May, 1999

Attest:

Q. TODD DICKINSON

Attesting Officer

Acting Commissioner of Patents and Trademarks